US006705518B2

(12) United States Patent
Park et al.

(10) Patent No.: US 6,705,518 B2
(45) Date of Patent: Mar. 16, 2004

(54) SYSTEM AND METHOD FOR PROVIDING TOURISM SERVICE USING RF IC CARD, AND STORAGE MEDIUM FOR STORING TOURISM SERVICE ALGORITHM THEREOF

(75) Inventors: Hong Joo Park, Koyang-shi (KR); Dae Young Kim, Seoul (KR); Chul Kwon, Seoul (KR)

(73) Assignee: Kookmin Credit Card Co., Ltd., Seoul (KR)

( * ) Notice: Subject to any disclaimer, the term of this patent is extended or adjusted under 35 U.S.C. 154(b) by 0 days.

(21) Appl. No.: 09/933,196

(22) Filed: Aug. 21, 2001

(65) Prior Publication Data

US 2002/0139843 A1 Oct. 3, 2002

(30) Foreign Application Priority Data

Mar. 28, 2001 (KR) ......................................... 2001-16219

(51) Int. Cl.[7] ................................................. G06K 5/00
(52) U.S. Cl. ........................................ 235/380; 235/492
(58) Field of Search ................................. 235/380, 492

(56) References Cited

U.S. PATENT DOCUMENTS

| 5,475,740 A | * | 12/1995 | Biggs, Jr. et al. ............. 379/91 |
| 5,841,866 A | * | 11/1998 | Bruwer et al. ................ 380/23 |
| 5,883,452 A | | 3/1999 | Masuda |
| 6,296,183 B1 | * | 10/2001 | Clark .......................... 235/380 |
| 6,353,420 B1 | * | 3/2002 | Chung ......................... 343/895 |

* cited by examiner

Primary Examiner—Harold I. Pitts
(74) Attorney, Agent, or Firm—Birch, Stewart, Kolasch & Birch, LLP

(57) ABSTRACT

A system for providing tourism service using RF IC card includes an RF IC card having an RF chip and providing a function of pre-paid card and a settlement server affiliated with domestic/international financial institutions, credit card companies, public transportation/communication facilities, and service centers via a public network, and for settling a used amount with the RF IC card at an affiliated corporation.

38 Claims, 4 Drawing Sheets

SYSTEM AND METHOD FOR PROVIDING TOURISM SERVICE USING RF IC CARD, AND STORAGE MEDIUM FOR STORING TOURISM SERVICE ALGORITHM THEREOF

BACKGROUND OF THE INVENTION (a) Field of the Invention

The present invention relates to a system and method for providing tourism services using a Radio Frequency (RF) Integrated Circuit (IC) card and a storage medium for storing a tourism service algorithm thereof . More particularly, the present invention relates to an RF IC card having the function of both a pre-paid and a credit card for using tourism services such as banking, transportation, communication, shopping, leisure, etc.

(b) Description of the Related Art

Generally, if a tourist wants to buy foreign currency or any goods in foreign countries during his/her trip, it is troublesome if a credit card or cash that he/she has is not available.

For example, it is very hard to get a pass or token since it is difficult to find a ticket box in the case of using public transportation. Furthermore, in the case of a pre-paid card, it is difficult to obtain a refund of a balance of the card if the card is lost, and it is also difficult to open a new account for a credit card only for a short trip. Also, the problems can be caused in not only public transportation but also other situations such as making a telephone call.

Moreover, automatic teller machines (ATM) for foreign tourists are not provided enough, and the functions of pre-paid cards such as calling cards for local or long distance calls are very limited.

SUMMARY OF THE INVENTION

The present invention has been made in an effort to solve the above problems.

It is an object of the present invention to provide a system and method for providing tourism services using an RF IC card and a storage medium for storing a tourism service algorithm thereof, which is capable of settling a used amount with the RF IC card to the rendered tourism services such as banking, transportation, communication, shopping, leisure, etc. It is another object of the present invention to provide the system and method for providing tourism services using the RF IC card and the storage medium for storing the tourism service algorithm thereof capable of settling a used amount to both domestically and internationally rendered tourism services and refunding a balance amount of the RF IC card if the card is lost.

In accordance with an aspect of the present invention, there is provided an RF IC card comprising an RF chip and providing a function of a pre-paid card; and a settlement server for affiliating with domestic/international financial institutions, credit card companies, public transportation/communication facilities, and service centers, and for settling a used amount with the RF IC card at an affiliated corporation.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

A preferred embodiment of the present invention will be described hereinafter with reference to the accompanying drawings.

The present invention relates to a system and method for settling the amount to the rendered domestic and international services from a user account after using tourism services banking, communication, transportation, shopping, leisure, etc. with a Radio Frequency Recognizing Integrated Circuit card (hereinafter, RF IC card) having function of a credit and a pre-paid card.

A system and method for providing tourism services using a Radio Frequency (RF) Integrated Circuit (IC) card and a storage medium for storing a tourism service algorithm thereof according to the preferred embodiment of the present invention includes computer systems and applications for implementing the same.

Instruction sets for executing functions of the system of the present invention reside in at least one memory and can be stored in an auxiliary storage medium such as a hard disc until the instruction sets are called.

Figure 1:
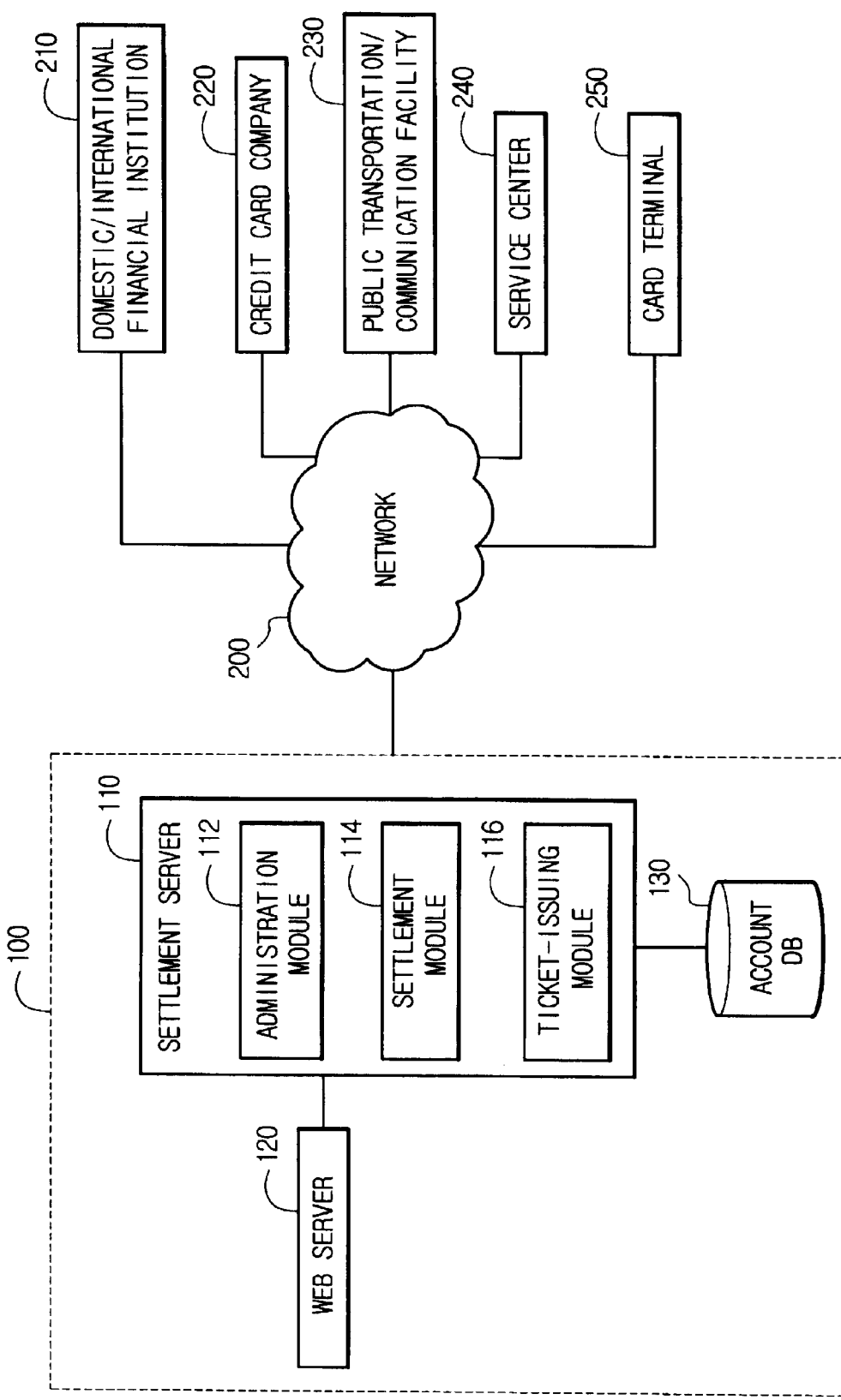
FIG. 1 is a block diagram illustrating a system for providing tourism services using an RF IC card in accordance with a preferred embodiment of the present invention.
Figure 2:
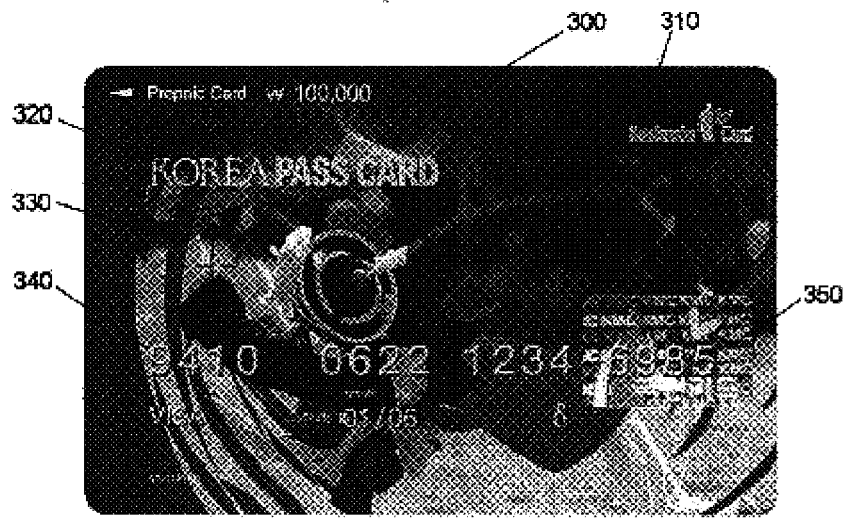
FIG. 2 is a front view illustrating an RF IC card in accordance with the preferred embodiment of the present invention.
Figure 3:
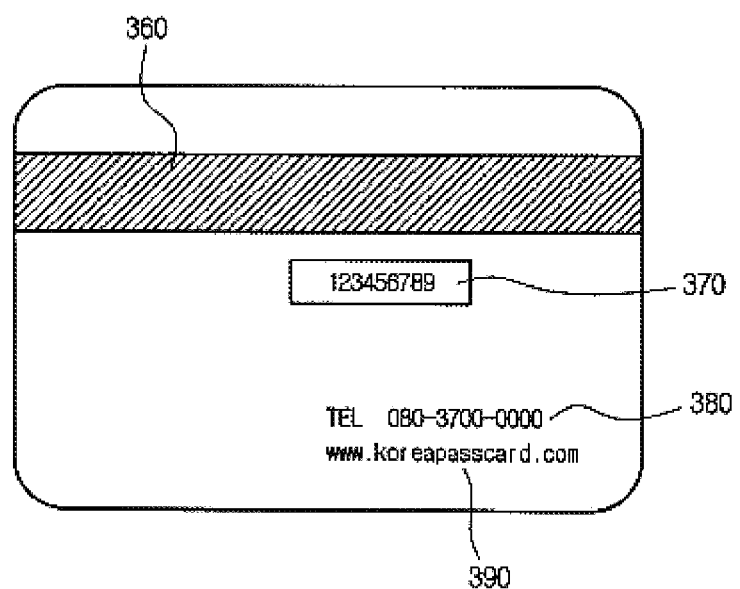
FIG. 3 is rear view illustrating an RF IC card of FIG. 2.

There are respectively shown a system for providing tourism services using an RF IC card in accordance with the present invention in FIG. 1, and front and rear views of the RF IC card in FIG. 2 and FIG. 3.

As shown, the system comprises an RF IC card 300 having an RF chip 330 and a settlement unit 100 affiliated with domestic/international financial institutions, credit card companies, public transportation/communication facilities, service centers, and card terminals via a public network 200 such as a value added network (VAN) and the Internet.

Referring to FIG. 1, the settlement server 110 is affiliated with domestic/international financial institutions 210, credit card companies 200, public transportation/communication facilities 230, and service centers 240 via a public network 200, and settles a used amount with the RF IC card at affiliated corporations.

A web server 120 provides information on affiliated corporations and tourism information on transportation, accommodation, shopping, convenience facilities, etc.

An account data base (DB) 130 stores information of users, settlement records, and affiliated corporations.

The settlement server 110 comprises an administration module 112 for verifying whether or not the user has a valid membership, and registering and administering the information of users and affiliated corporations. A settlement module 114 is provided for settling a used amount with an RF IC card if the RF IC card is verified and the settlement is permitted by the affiliated financial institutions 210 or the credit card companies 220. A ticket-issuing module 116 is provided for controlling the card terminal 250 to issue an exchange ticket in response to a user's request after referring to the settlement module 114 whether the RF IC card is verified and settlement is permitted.

If the user requests the RF IC card, the card terminal 250 issues an exchange ticket for the RF IC card to the user having a valid membership, and provides the information of the affiliated corporations and the tourism information through the public network 200 if requested.

The administration module 112 selects and contracts a member shop qualified by predetermined accredit-conditions among applicants, and administrates data of the member shops in the account DB 130 after registering. Moreover, the administration module 112 evaluates the member shops with the predetermined accredit-conditions periodically, and promotes that the member shops have satisfied the conditions by publicizing the same using the web server 120 or cancels the memberships of the member shops that do not satisfy the conditions.

The settlement module 114 recharges the RF IC card in an amount of a user's request through an automatic response system (ARS), telephone, or the Internet, and refunds a balance of the RF IC card after checking a user's settlement information with a receipt when a refund is requested.

The ticket-issuing module 116, if a reservation is requested, issues a receipt and reservation tickets in response to the reservation request after making a reservation for any affiliated corporations and requesting a settlement of the reservation to the settlement module 114.

Referring to FIG. 2, the RF IC card has the RF chip 330 installed inside thereof and is provided with a logo of an issuing institution 310, a card name 320, an RF IC card serial number 340, and a hologram 350 on the front side thereof. The serial number 340 consists of a predetermined-size binary code number, a card serial number, and a class number.

Referring to FIG. 3, the RF IC card is provided with a magnetic strip 360, a telephone card number 370, a telephone number 380, and a web site address 390. The magnetic strip 360 stores an executive number divided by a charged amount, characteristic of the RF IC card, affiliated corporation code, security number, and valid date.

A method for providing tourism service using the RF IC card according to the present invention will be described hereinafter with reference to FIG. 4.

Figure 4:
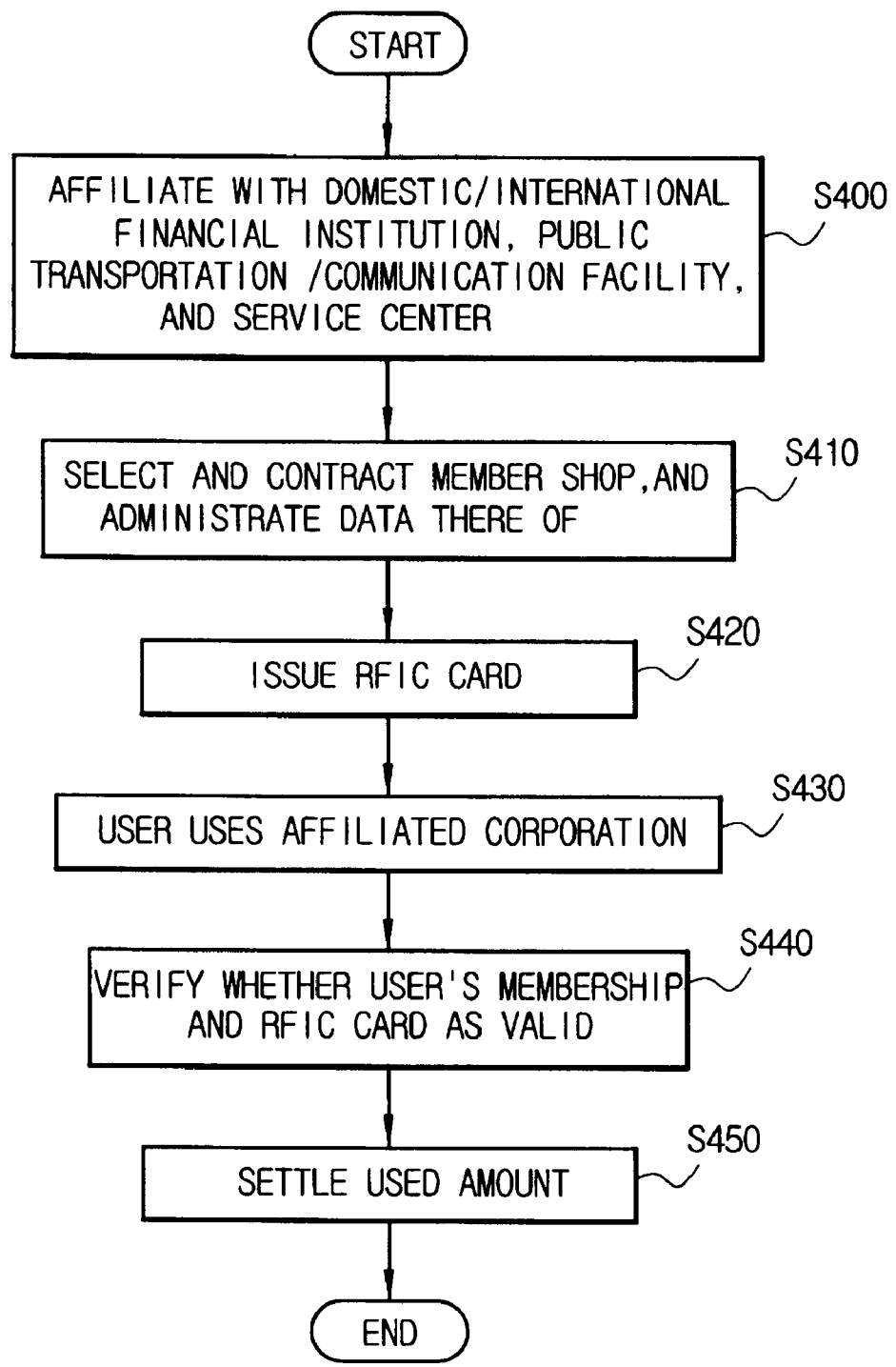
FIG. 4 is a flowchart illustrating a system for providing tourism services using the RF IC card in FIG. 1.

Referring to FIG. 4, the settlement server 110 is affiliated with the domestic/international financial institutions, the credit card companies, the public transportation/communication facilities, and the service centers, at step S400. Then, the administration module 112 selects and contracts member shops qualified by predetermined accredit-conditions among applicants, and administrates data of the member shop after registering, at step S410.

A user can apply for the RF IC card through the card terminal 250 at a head or member shop, at step S420. If the user inputs the required information for applying, the inputted information is transmitted to the settlement server 110 through the web server 120. Then the administration module 112 verifies the membership of the user. If not verified, the administration module 112 provides leading information to lead the user to input required information for obtaining membership and registers a membership of the user at the account DB 130 after receiving the user's required information. If verified, the administration module 112 verifies whether or not the RF IC card is being renewed.

The ticket-issuing module 116, after the user's membership is verified, refers a settlement to the settlement module 114 in response to the user's request. Then, the settlement module 114 settles a used amount with the RF IC card if the RF IC card is verified and the settlement is permitted by the affiliated financial institutions or the credit card companies. Then, the ticket-issuing module 116 controls the card terminal 250 so as to issue the exchange ticket for the RF IC card to the user.

After that, the card terminal 250 issues the exchange ticket controlled by the ticket-issuing module 116. Therefore, the user can exchange the exchange ticket to an RF IC card at the member shops, agents or card distributors.

Furthermore, the agent provides a tour-information guidebook to the user at the time of issuance of the RF IC card, and the user is provided the affiliated corporations and tour-information of transportation, accommodation, shopping, etc. through the card terminal or web site.

At step S430, if the user wants to pay a used amount with the RF IC card at affiliated corporations, the RF IC card is inserted into the card terminal 250, and the card terminal 250 transmits information of the RF IC card to the settlement server 110. Then the administration module 112 verifies whether the user's membership and RF IC card are valid, at step S440. If valid, the settlement module 114 settles the used amount with the RF IC card after permission of settlement by the affiliated financial institutions or the credit card companies, at step S450. The result of settlement is transmitted to the card terminal 250, and the receipt is provided to the user.

Furthermore, the user can recharge the RF IC card in an amount of a user's request through an automatic response system (ARS), telephone, or the Internet. In detail, the administration module 112 also verifies whether the user's membership and RF IC card are valid or not. If valid, the settlement module 114 also settles the requested amount for recharging to the affiliated financial institutions or credit card companies, then recharges the RF IC card in the requested amount by the user.

If the user requests any reservation tickets such as theater or concert tickets, the administration module 112 verifies whether the user's membership and RF IC card are valid, and the ticket-issuing module 116 makes a reservation for any affiliated corporations in response to the user's reservation request. If a reservation is permitted by the affiliated corporation, the settlement module 114 settles the used amount, then the card terminal 250 outputs the reservation ticket and receipt to the user, and therefore the user can exchange the reservation ticket for an entrance ticket at the ticket box.

Meanwhile, if the RF IC card is lost, the user reports the lost-card and requests-refund through the automatic response system (ARS), telephone or the Internet, and then the settlement server 110 receives information of the report. The settlement module 114 ascertains the balance of the RF IC card after checking the user's settlement information with receipts. The lost-card is no longer valid, and the information is registered at the account DB 130. Refunding the balance or renewing the RF IC card is then provided to the user in accordance with the user's request.

Another method for refund is provided to the user through a clerk. If the user reports the lost-card directly to the clerk with a receipt, the clerk inputs information of the receipt such as the card number, serial number of affiliate agent, used amount and date, etc. Then the inputted information is transmitted to the settlement server 110, and the settlement module 114 ascertains the balance amount of the RF IC card in accordance with the inputted information. Therefore, the ascertained balance amount is possible to be refunded to the user.

While a pre-paid card in the prior art cannot refund the balance of the card in case of a lost-card due to a limitation of the card controlled on the card, the present invention can refund the balance of the RF IC card even if the RF IC card is lost because of limitation of the RF IC card is controlled by the settlement server. Thus, the balance of the RF IC card can be refunded, if the RF IC card is used more than one time. Furthermore, only the receipt is needed for a refund of the balance of the RF IC card to the user in contrast to all information of the user needed in prior art.

Figure 5:
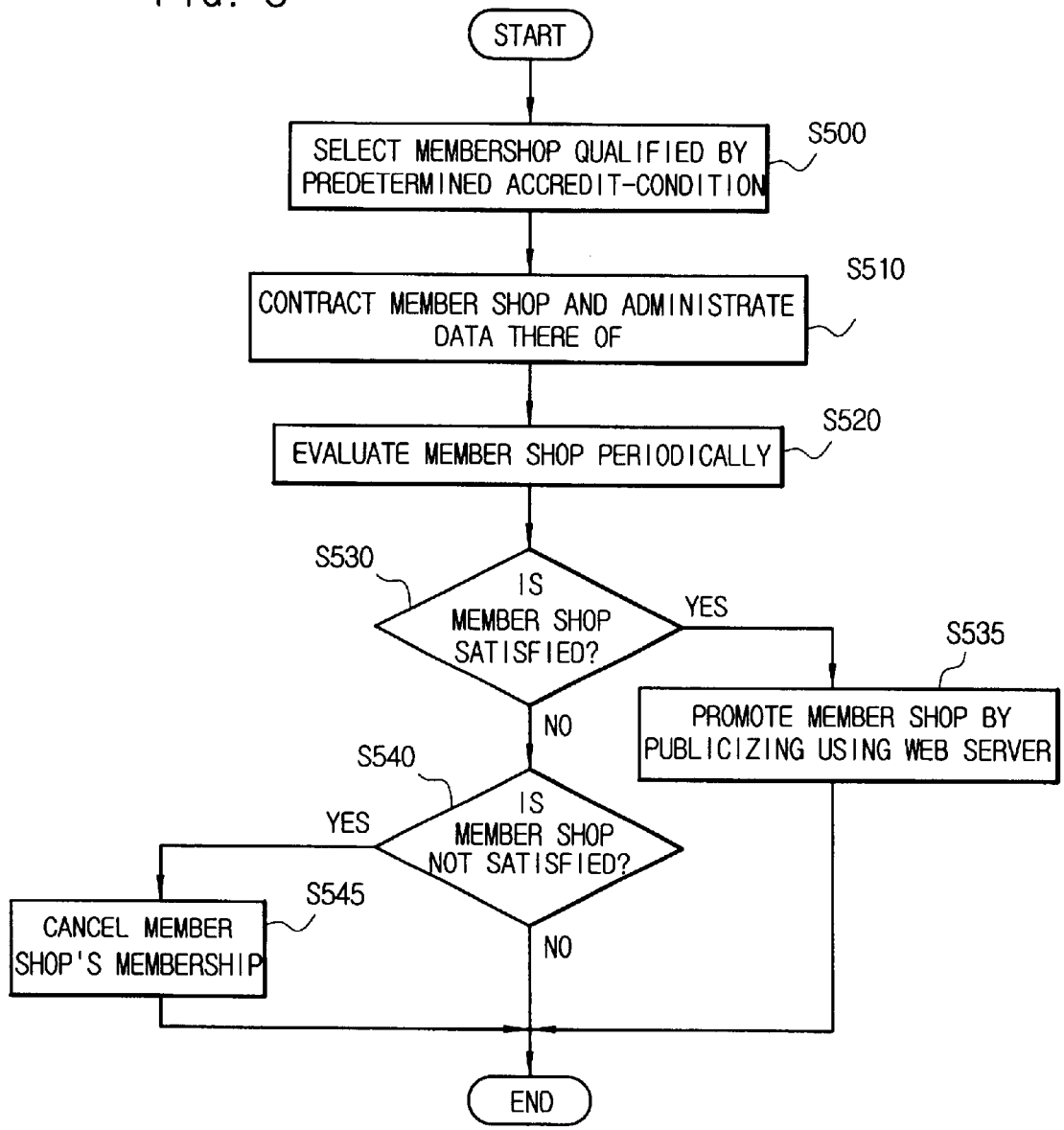
FIG. 5 is a flowchart illustrating an operation of the system for providing tourism services using the RF IC card in FIG. 4.

Referring to FIG. 5, there are 3 steps explaining an operation of the system for providing tourism services using an RF IC card. The first step is for affiliating with a plurality of service corporations and for selecting and contracting a member shop, the second step is for issuing the RF IC card through the card terminal 250 or the Internet, and the third step is for settling a used amount with an RF IC card at the affiliated corporations.

First of all, the administration module 112 selects a member shop qualified by predetermined accredit-conditions among applicants, at step S500. Then the administration module 112 contracts the member shop and administrates data of the member shops in the account DB 130 after registering, at step S510. If applicant is not qualified, the administration module 112 leads them to reapply or outputs a failure-application message to them.

Further, the administration module 112 evaluates the member shops with the predetermined accredit-conditions periodically, at step S520. Namely, if the member shop satisfies the conditions, at step S530, the administration module 112 promotes the member shop by publicizing the same using the web server 120, at step S535. If the member shops do not satisfy the conditions, at step S540, the administration module 112 cancels memberships of the member shops, at step S545.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A system for providing tourism services using an RF IC card, comprising:
    an RF IC card having an RF chip and providing a function of a pre-paid card; and
    a settlement server, said settlement server being affiliated with domestic/international financial institutions, credit card companies, public transportation/communication facilities, and service centers via a public network, and for settling a used amount with the RF IC card at an affiliated corporation.

2. The system of claim 1, wherein the RF IC card has a function of a credit card.

3. The system of claim 2, wherein the RF IC card is provided with a predetermined-size binary code number, a card serial number, and a class number.

4. The system of class 3, wherein the RF IC card is provided with a predetermined-size control number for comprising a charged amount, features of the RF IC card, an affiliated corporation code, a security number and a valid date.

5. The system of claim 1, further comprising a web server for providing information on the affiliated corporations, and tourism information for transportation, accommodation, shopping, and convenience facilities.

6. The system of claim 1, further comprising an account data base for storing information on user, settlement records, and the affiliated corporations.

7. The system of claim 1, further comprising a card terminal for issuing an exchange ticket for the RF IC card to the user having a valid membership in accordance with the user's request.

8. The system of claim 7, wherein the card terminal provides information on the affiliated corporation and tourism information transmitted from a web server to the user.

9. The system of 8, wherein the settlement server comprises:
    an administration module for verifying whether or not the user has a valid membership, said administration module registering and administrating information of users and affiliated corporations;
    a settlement module for settling a used amount with the RF IC card if the RF IC card is verified and the settlement is permitted by the affiliated financial institutions or the credit card companies; and
    a ticket-issuing module for controlling the card terminal to issue an exchange ticket for the RF IC card in response to a user's request after referring to the settlement module whether the RF IC card is verified and settlement is permitted.

10. The system of claim 9, wherein the administration module evaluates whether applicants are qualified to be member shops of the RF IC card with predetermined accredit-conditions, selects member shops, and registers data of the member shops in the settlement module.

11. The system of claim 9, wherein the administration module evaluates the member shops with the predetermined accredit-conditions periodically and promotes the member shops satisfying the conditions by publicizing the same using the web server, and cancels a membership of the member shops not satisfying the conditions.

12. The system of claim 9, wherein the settlement module settles the requested amount for recharging to the affiliated financial institutions or credit card companies, and recharges the RF IC card in the requested amount by the user through an automatic response system (ARS), telephone, or the Internet.

13. The system of claim 9, wherein the settlement module refunds the balance of the RF IC card after checking the user's settlement information with a receipt in case of a lost-card.

14. The system of claim 9, wherein the ticket-issuing module issues a receipt and a reservation ticket in response to a user's reservation request after making a reservation for the affiliated corporations and requesting settlement of the reservation to the settlement module.

15. A method for providing tourism services using an RF IC card, comprising the steps of:
    (a) affiliating with domestic/international financial institutions, credit card companies, public transportation/communication facilities and service centers, and selecting and contracting with member shops;

(b) issuing the RF IC card through a card terminal or Internet; and (c) setting a used amount with the RF IC card at an affiliated corporation.

16. The method of claim 15, further comprising the step of:

(d) refunding a balance on the RF IC card after checking a user's settlement information with a receipt if a refund is requested by the user.

17. The method of claim 15, wherein information on the affiliated corporations, and tourism information for transportation, accommodation, shopping, and convenience facilities is provided through a public web site.

18. The method of claim 16, wherein information on the affiliated corporations, and tourism information for transportation, accommodation, shopping, and convenience facilities is provided through a public web site.

19. The method of claim 17, wherein the step (a) further comprises the steps of:

(a1) selecting member shops qualified by predetermined accredit-conditions among applicants;

(a2) contracting the member shops and registering data of the member shops; and (a3) evaluating the member shops with the predetermined accredit-conditions periodically, promoting the member shops satisfying the conditions by publicizing the same using a web server.

20. The method of claim 18, wherein the step (a) further comprises the steps of:

(a1') selecting member shops qualified by predetermined accredit-conditions among applicants;

(a2') contracting the member shops and registering data of the member shops; and (a3') evaluating the member shops with the predetermined accredit-conditions periodically, promoting the member shops satisfying the conditions by publicizing the same using a web server.

21. The method of claim 17, wherein the step (c) further comprises the steps of:

(c1) verifying whether a user's membership and RF IC card are valid; and (c2) issuing an exchange ticket for the RF IC card through a card terminal or Internet after settling a used amount in response to a user's request for the RF IC card.

22. The method of claim 18, wherein the step (c) further comprises the steps of:

(c1') verifying whether a user's membership and RF IC card are valid; and (c2') issuing an exchange ticket for the RF IC card through a card terminal or Internet after settling a used amount in response to a user's request for the RF IC card.

23. The method of claim 21, wherein the step (c2) further comprises the step of settling the requested amount for recharging to the affiliated financial institutions or credit card companies, and recharging the RF IC card in the requested amount by the user through an automatic response system (ARS), telephone, or Internet.

24. The method of claim 22, wherein the step (c2') further comprises the step of settling the requested amount for recharging to the affiliated financial institutions or credit card companies, and recharging the RF IC card in the requested amount by the user through an automatic response system (ARS), telephone, or Internet.

25. The method of claim 21, wherein the step (c2) further comprises the step of issuing a receipt and a reservation ticket in response to a user's reservation request after making a reservation for the affiliated corporations and requesting settlement of the reservation.

26. The method of claim 22, wherein the step (c2') further comprises the step of issuing a receipt and a reservation ticket in response to a user's reservation request after making a reservation for the affiliated corporations and requesting settlement of the reservation.

27. A storage medium containing a tourism service program using an RF IC card, the tourism service program comprising the processes of:

(a) affiliating with domestic/communication facilities and service centers, and selecting an contracting with member shops;

(b) issuing the RF IC card through a card terminal or Internet; and (c) settling a used amount with the RF IC card at the affiliated corporations.

28. The storage medium of claim 27, wherein the tourism service program further comprising the process of:

(d) refunding a balance of the RF IC card after checking a user's settlement information with a receipt if a refund is requested by the user.

29. The storage medium of claim 27, wherein information of the affiliated corporation, and tourism information for transportation, accommodation, shopping, and convenience facilities is provided through a web site.

30. The storage medium of claim 28, wherein information of the affiliated corporation, and tourism information for transportation, accommodation, shopping, and convenience facilities is provided through a public web site.

31. The storage medium of claim 29, wherein the process (a) further comprises the processes of:

(a1) selecting member shops qualified by predetermined accredit-conditions among applicants;

(a2) contracting the member shops and registering data of the member shops; and (a3) evaluating the member shops with the predetermined accredit-conditions periodically, promoting the member shops satisfying the conditions by publicizing the same using a web server.

32. The storage medium of claim 30, wherein the process (a) further comprises the processes of:

(a1') selecting member shops qualified by predetermined accredit-conditions among applicants;

(a2') contracting the member shops and registering data of the member shops; and (a3') evaluating the member shops with the predetermined accredit-conditions periodically, promoting the member shops satisfying the conditions by publicizing the same using a web server.

33. The storage medium of claim 29, wherein the process (c) further comprises the processes of:

(c1) verifying whether a user's membership and RF IC card are valid; and (c2) issuing an exchange ticket for the RF IC card through a card terminal or Internet after settling a used amount in response to a user's request for the RF IC card.

34. The storage medium of claim 30, wherein the process (c) further comprises the processes of:

(c1) verifying whether a user's membership and RF IC card are valid; and (c2) issuing an exchange ticket for the RF IC card through a card terminal or Internet after settling a used amount in response to a user's request for the RF IC card.

35. The storage medium of claim 33, wherein the process (c2) further comprises the process of settling the requested amount for recharging to the affiliated financial institutions or credit card companies, and recharging the RF IC card in the requested amount by the user through an automatic response system (ARS), telephone, or Internet.

36. The storage medium of claim 34, wherein the process (c2) further comprises the process of settling the requested amount for recharging to the affiliated financial institutions or credit card companies, and recharging the RF IC card in the requested amount by the user through an automatic response system (ARS), telephone, or Internet.

37. The storage medium of claim 33, wherein the process (c2) further comprises the process of issuing a receipt and a reservation ticket in response to a user's reservation request after making a reservation for the affiliated corporations and requesting settlement of the reservation.

38. The storage medium of claim 34, wherein the process (c2) further comprises the process of issuing a receipt and a reservation ticket in response to a user's reservation request after making a reservation for the affiliated corporations and requesting settlement of the reservation.

* * * * *